United States Patent [19]

Lorenzen et al.

[11] Patent Number: 4,869,550

[45] Date of Patent: Sep. 26, 1989

[54] FLAT HEATER FOR INCORPORATION IN SEATS OF VEHICLES

[75] Inventors: Günter Lorenzen, Olching; Bodo Ruthenberg, Munich, both of Fed. Rep. of Germany

[73] Assignee: Wärme- und Elektrotechnik B. Ruthenberg GmbH, Fed. Rep. of Germany

[21] Appl. No.: 153,149

[22] Filed: Feb. 8, 1988

[30] Foreign Application Priority Data

Feb. 9, 1987 [DE] Fed. Rep. of Germany ....... 3703939

[51] Int. Cl.[4] ............................................... A47C 7/72
[52] U.S. Cl. ...................................... 297/180; 297/217
[58] Field of Search ..................... 297/180, 453; 5/421; 219/212, 217

[56] References Cited

U.S. PATENT DOCUMENTS

| 4,044,221 | 8/1977 | Kuhn | 297/217 |
| 4,423,308 | 12/1983 | Callaway et al. | 297/217 |
| 4,590,359 | 5/1986 | Mobius | 219/217 |

FOREIGN PATENT DOCUMENTS

| 0057241 | 8/1982 | European Pat. Off. | 297/180 |
| 2850323 | 5/1980 | Fed. Rep. of Germany . | |
| 3117402 | 11/1982 | Fed. Rep. of Germany . | |
| 3333047 | 3/1985 | Fed. Rep. of Germany . | |
| 3513909 | 10/1986 | Fed. Rep. of Germany . | |
| 7711246 | 4/1977 | France . | |
| 8025636 | 3/1980 | France . | |
| 1113433 | 5/1968 | United Kingdom . | |
| 1196320 | 6/1970 | United Kingdom | 297/180 |

*Primary Examiner*—James T. McCall
*Attorney, Agent, or Firm*—Hamilton, Brook, Smith & Reynolds

[57] ABSTRACT

Improved vehicle seats can be made in a process in which the seat-covering material and a flat heater are inserted into a negative mold for a vehicle seat and the mold is filled with in-situ foam because the flat carrier for the heating conductor of the heater is constituted by a braided wide-mesh grid made of plastic strings or plastic yarns, which during the filling of the negative mold for vehicle seats with in-situ plastic foam are surrounded by the foam substantially without a change of the porosity of the plastic foam.

14 Claims, 1 Drawing Sheet

FLAT HEATER FOR INCORPORATION IN SEATS OF VEHICLES

BACKGROUND OF THE INVENTION

This invention relates to a flat heater for incorporation in seats of vehicles, comprising a flat carrier and a heating conductor, which is secured to the carrier in a pattern which covers a surface of the carrier.

DESCRIPTION OF THE PRIOR ART

In the previous practice, flat heaters have been provided on a seat cushion before the latter was provided with a cover. The heater designed, e.g., like a harpsichord was slidably inserted into corresponding pockets in a laminate which covered the seat cushion.

It has also been proposed to simplify the manufacture of seats of vehicles in that a seat-covering material consisting of a woven textile fabric and a polyurethane layer bonded thereto was inserted in a negative mold for a vehicle seat and the mold cavity was then filled with polyurethane foam formed in situ so that the complete seat for a vehicle could be removed from the mold when the foam had hardened. In that case, difficulties will arise if flat heaters to be incorporated in vehicle seats are inserted on the seat-covering material into the negative mold for the vehicle seat before the foaming operation. These difficulties are due to the fact that the flat carriers for the heating conductors of such vehicle seat heaters influence the formation of foam in the negative mold for the vehicle seat so that foamed plastic portions which differ in thickness and differ in porosity and usually have a very low porosity are formed between the seat-covering material and the flat heater that has been inserted into the mold. This results in hardened portions and in a non-uniform heating of the surface of the vehicle seat and owing to the reduced compliance of the vehicle seats in local regions results in damage to the heating conductors and of the compound structure.

SUMMARY OF THE INVENTION

The object of the invention is to provide for incorporation in seats of vehicles a flat heater which is of the general kind defined first hereinbefore and which is so designed that the heater can be used in the manufacture of vehicle seats in a process in which the seat-covering material and the flat heater are directly inserted into a negative mold for a car seat and the mold cavity is subsequently filled with in-situ foam in such a manner that a formation of local hardened portions and zones having a lower compliance will be avoided.

That object is accomplished in accordance with the invention in that the carrier of the flat heater is constituted by a wide-mesh grid, particularly a braided grid, consisting of substantially electrically insulating elastic material. The carrier preferably consists of a braided grid of plastic yarns or strings, particularly of polyethylene or polyester, or of glass filament yarn, and the grid or braided grid has in particular square meshes having a side length from 3 mm to 12 mm. The lands of the grid may have a thickness from 0.3 mm to 1.5 mm. In a modification of the design just described, the term wide-mesh grid covers also a perforate plastic sheeting.

It has been found that in a flat heater of that design the plastic foam extends through covers and the monolayer grid or braided grid of the carrier and extends as far as to the seat-covering material and this will be accomplished without a substantial change of the porosity of the foam.

A floating of the flat heater during the foaming is prevented by dots of adhesive, which become effective as the flat heater is inserted into the mold to lie on the seat-covering material and which adhere on one side to the braided grid of the carrier and on the other side to the seat-covering material.

DETAILED DESCRIPTION OF THE PREFERRED EMBODIMENT

Figure 1:
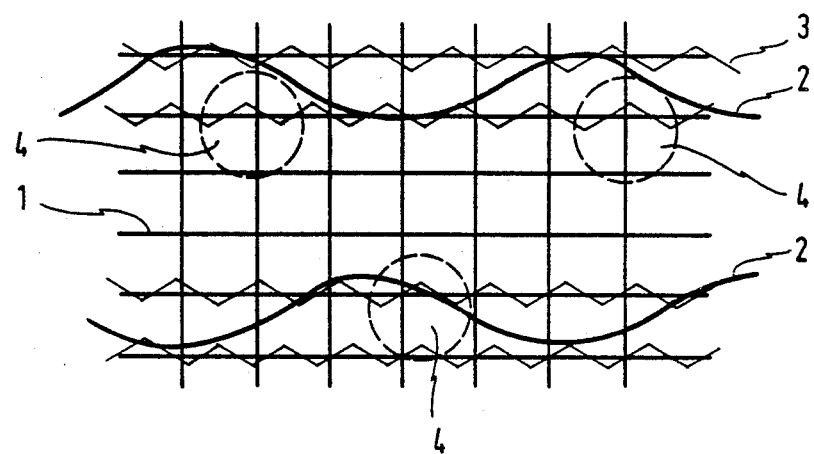
FIG. 1 is a diagrammatic top plan view showing a portion of a flat heater of the kind described here.

An illustrative embodiment will now be described with reference to the drawings.

A flat heater for incorporation in vehicle seats of the kind described hereinbefore comprises a flat carrier 1 consisting of a braided grid of plastic yarns, which have a thickness of about 0.5 mm. The meshes are square and have a side length of about 5 mm. An insulated heating conductor 2 has been laid on the carrier 1 in wave lines and, as is apparent from FIG. 2, in a meander pattern and is secured to the carrier 1 by zigzag seams formed by a thin plastic yarn 3. Those skilled in the art will be aware of a large number of patterns in which the heating conductor can be laid and of a large number of techniques for fixing the heating conductor to the carrier and said patterns and techniques may also be used in the present case.

Adhesive dots 4 have been applied to one surface of the carrier, e.g., to the surface which faces away from the heating conductors 2. Said adhesive dots 4 serve to hold the flat heater on the seat-covering material when the heater has been inserted into the negative mold for a vehicle seat and laid on the seat-covering material so that the heater will not float up during the foaming in the mold. To apply adhesive dots 4 to the braided grid of the carrier 1, a silicone paper carrying the adhesive dots is forced against the carrier 1 and is then peeled from the flat heater so that the adhesive dots 4 are left on the carrier to which they appear so as to present an exposed tacky surface.

Figure 2:
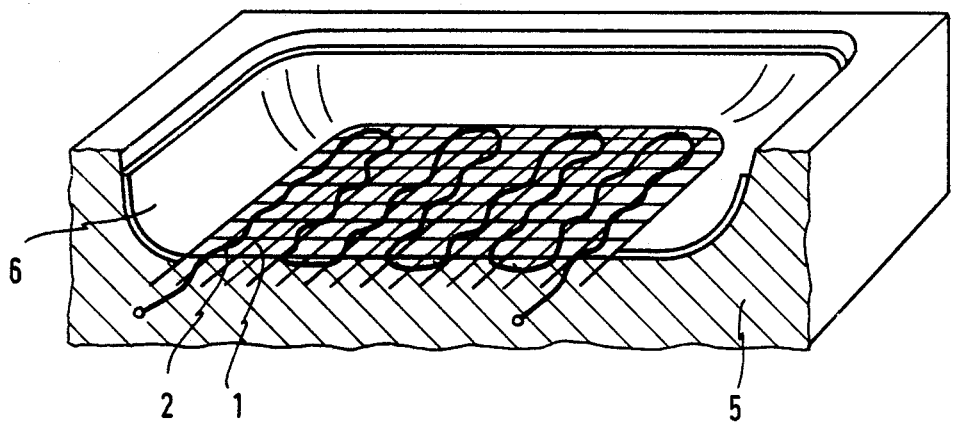
FIG. 2 is a perspective view showing partly in section a portion of a car seat mold with portions of an inserted seat-covering material and portions of an inserted heater.
Figure 3:
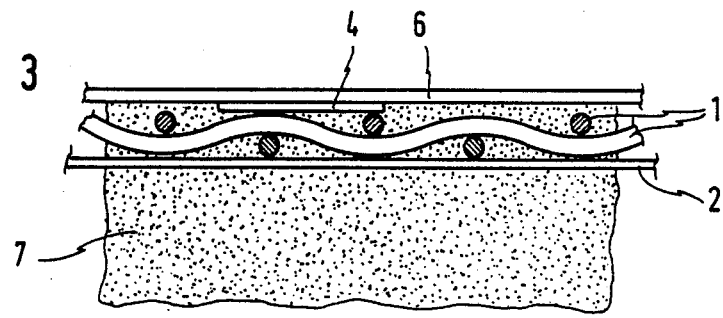
FIG. 3 shows on a larger scale a diagrammatic fragmentary transverse sectional view showing a vehicle seat portion adjacent to the seat cover.

FIG. 2 is a diagrammatic fragmentary view showing a portion of a negative mold 5 for a vehicle seat and a portion of a seat-covering material 6 which has been inserted into that mold. On the side which faces the mold 5 the seat-covering material 6 comprises a woven textile fabric, to which a layer of polyurethane foam has been bonded on the side which faces the interior of the mold. A flat heater of the type described herein has also been inserted into the mold cavity and has been secured to the seat-covering material 6 by the adhesive dots 4. Because the flat heater is fixed only at certain points to the inside surface of the seat cover, the polyurethane foam, designated 7 in FIG. 4, which is used to make the seat cushion, can flow without restriction through the braided grid of the carrier 1 as far as to the seat-covering material. Adjacent to the heating conductor 2 secured to the carrier 1 and in the regions around the lands of the grid the polyurethane foam has substantially the same porosity as in the remaining regions of the seat cushion so that there will be no hardened portions. Besides, the distance from the heating conductor 2 to the surface of the seat-covering material is constant owing to the fixation of the heater by the adhesive dots 4 so that a uniform temperature rise of the top surface of the vehicle seat is ensured.

We claim:

1. A flat heater for incorporation in seats for vehicles, comprising a flat carrier (1) and an insulated heating conductor (2), which is secured to the carrier by a securing means in a pattern which covers a surface of the carrier, such that the carrier comprises a wide-mesh grid of substantially electrically insulating, perforate material.

2. A heater according to claim 1, characterized in that the carrier (1) is constituted by a braided grid consisting of plastic yarns or strings, in particular of polyethylene, or polyester, or consisting of glass filament yarns.

3. A heater element according to claim 2, characterized in that the grid consists of square meshes having a side length from 3 mm to 12 mm.

4. A heater according to claim 2, characterized in that the lands of the grid have a thickness from 0.3 mm to 1.5 mm.

5. A heater according to claim 1 characterized in that the securing means comprises a stitching thread (3).

6. A heater according to claim 1, characterized in that the carrier (1) is provided on one of its surfaces with adhesive dots (4).

7. A heater according to claim 1, characterized in that its carrier consists of a single layer.

8. A heater according to claim 1, characterized in that those surfaces of the adhesive dots (4) which face away from carrier (1) are covered by a covering layer which can be peeled off and particularly consists of a silicone paper.

9. A vehicle seat comprising a heater according to claim 1, characterized in that the gridlike carrier (1) provided with the insulated heating conductor (2) secured to said carrier by said securing means adjoins a seat-covering material (6) and is joined thereto by adhesive dots (4) and a cushion stuffing made of polyurethane foam and having a substantially uniform porosity surrounds the heating conductor (2) and the lands of the grid like carrier (1) and extends as far as to the seat-covering material (6).

10. A heater according to claim 1 wherein the wide-mesh grid comprises substantially electrically insulating elastic material.

11. A heater according to claim 1 wherein the wide-mesh grid comprises perforated plastic sheeting.

12. A heater according to claim 1 wherein the securing means comprises adhesive.

13. A heating system for vehicle seats comprising:
a permeable carrier having a wide-mesh grid;
an insulated conductive heating element secured to one side of the carrier and formed in a pattern extending across the side of the carrier;
a foam of substantially uniform porosity extending through the permeable carrier and about the conductor such that the carrier and conductor are positioned adjacent each other in the foam.

14. The heating system of claim 13 further comprising a seat cover secured to the carrier such that the cover is a substantially uniform distance from the heating element across the pattern.

* * * * *